United States Patent [19]

Terry et al.

[11] Patent Number: 4,810,270
[45] Date of Patent: Mar. 7, 1989

[54] SEPARATOR

[75] Inventors: Byron R. Terry, Neenah, Wis.; Kurt Niederer, Charlotte, N.C.

[73] Assignee: Kimberly-Clark Corporation, Neenah, Wis.

[21] Appl. No.: 790,700

[22] Filed: Oct. 24, 1985

[51] Int. Cl.⁴ .......................................... B01D 46/04
[52] U.S. Cl. ...................... 55/294; 55/302; 55/337; 55/525; 209/274; 209/305; 209/391
[58] Field of Search ............... 55/294, 300, 302, 303, 55/337, 525; 209/274, 276, 281, 305, 359, 391, 273

[56] References Cited

U.S. PATENT DOCUMENTS

| | | | |
|---|---|---|---|
| 2,796,146 | 6/1957 | Hersey et al. | 55/294 |
| 2,916,142 | 12/1959 | Fontein | 209/274 |
| 2,976,796 | 3/1961 | Anthony et al. | 55/525 X |
| 3,045,823 | 7/1962 | Fontein | 209/274 |
| 3,085,381 | 4/1963 | Sobeck | 55/525 X |
| 3,519,130 | 7/1970 | Jachna | 209/305 |
| 3,957,639 | 5/1976 | Schoen et al. | 55/294 X |
| 3,958,296 | 5/1976 | Fell | 55/294 X |
| 4,309,284 | 1/1982 | Morimoto | 209/273 |
| 4,461,702 | 7/1984 | Furukawa | 209/305 X |

FOREIGN PATENT DOCUMENTS

| | | | |
|---|---|---|---|
| 0648263 | 2/1979 | U.S.S.R. | 209/305 |
| 0741944 | 7/1980 | U.S.S.R. | 209/305 |

Primary Examiner—Charles Hart
Attorney, Agent, or Firm—Gregory E. Croft

[57] ABSTRACT

A separator for separating fibers from fines in a flow of gas includes an enclosed housing which includes a cylindrical upper section and a lower section. A screen basket is fixedly mounted in the housing, and this basket defines a screened cylindrical wall, a closed bottom, and an open top. The screen basket is positioned in the housing to define an annular chamber between the upper section of the housing and the screened cylindrical wall of the basket. A first duct is mounted to pass a first flow of gas, fibers and fines into an upper portion of the annular chamber, and is oriented tangentially to cause the first flow to swirl around the screened cylindrical wall. A second duct is mounted to remove gas and fines which have passed through the screened cylindrical wall, and a third duct is mounted to remove gas and fibers which have passed to the lower section of the housing from the lower section.

8 Claims, No Drawings

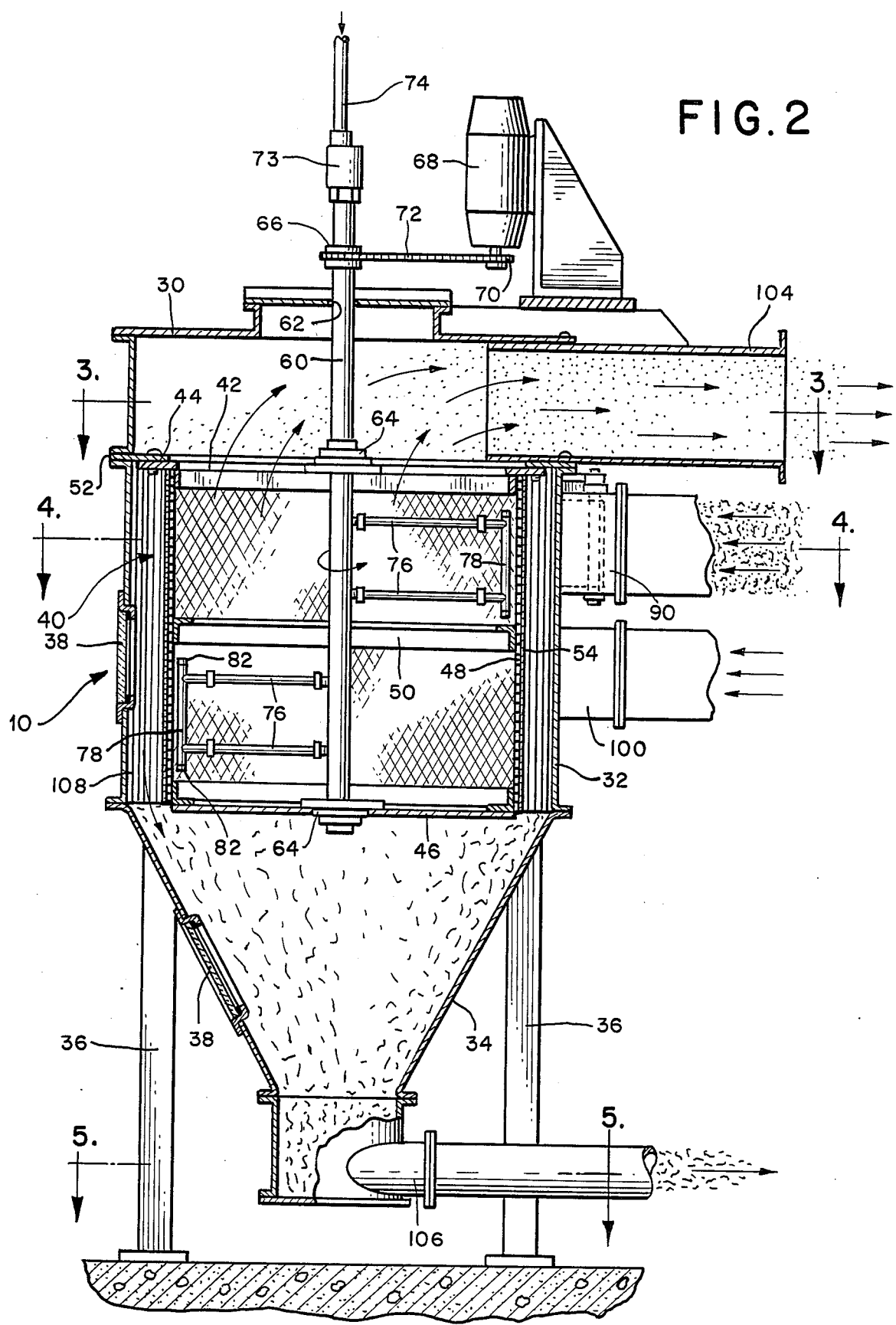

SEPARATOR

BACKGROUND OF THE INVENTION

The present invention is directed to a separator for separating fibers from fines in a flow of gas.

In the past, a variety of approaches have been used for separating smaller airborne particles from larger airborne material. One approach of the prior art, as typified, for example, in U.S. Pat. Nos. 2,009,140, 3,727,755, and 4,222,754, utilizes a rotating drum covered with a fine screen. Air with entrained particles passes through the screen, leaving behind larger material on the surface of the screen.

A second approach of the prior art is to use a traveling wire separator which includes a closed loop of fine screen which is caused to move around two spaced parallel rollers. U.S. Pat. Nos. 3,890,220, 3,353,947 and 3,789,587 are examples of the traveling wire separator approach.

Both of these prior art approaches include moving screens, and thus both require a drive mechanism for the moving screen. The rotating drum approach requires that the drum be properly balanced, and the traveling wire approach flexes the screen, thereby reducing the life of the screen due to cold working.

SUMMARY OF THE INVENTION

The present invention is directed to an improved separator which utilizes a substantially static screen in order to minimize problems associated with flexing of the screen and the need for a mechanism to move the screen.

According to this invention, a separator for separating fibers from fines in a flow of gas is provided, which comprises an enclosed housing. An arcuate screen which defines first and second sides is stationarily mounted within the housing. Means are provided for introducing a flow of gas, fines and fibers tangentially onto the first side of the arcuate screen, and means are provided for withdrawing a first portion of the flow of gas and entrained fines which have passed through the screen from the second side of the screen. A second portion of the flow of gas and entrained fibers is withdrawn from the first side of the screen.

The present invention provides important advantages. Because the screen itself is substantially stationary, problems associated with a system for rotating or translating the screen are entirely avoided. In addition, problems associated with balance of the moving screen are avoided as well. The preferred embodiments described below minimize screen flexing and therefore provide excellent screen life. Furthermore, these embodiments entirely avoid the need for seals adjacent to the screen, and the lack of seals further contributes to the life of the screen itself.

The invention itself, together with further objects and attendant advantages, will best be understood by reference to the following detailed description, taken in conjunction with the accompanying drawings.

BRIEF DESCRIPTION OF THE DRAWINGS

FIG. 2 is a longitudinal sectional view taken along line 2—2 of FIG. 1.

DETAILED DESCRIPTION OF THE PRESENTLY PREFERRED EMBODIMENTS

Figure 1:
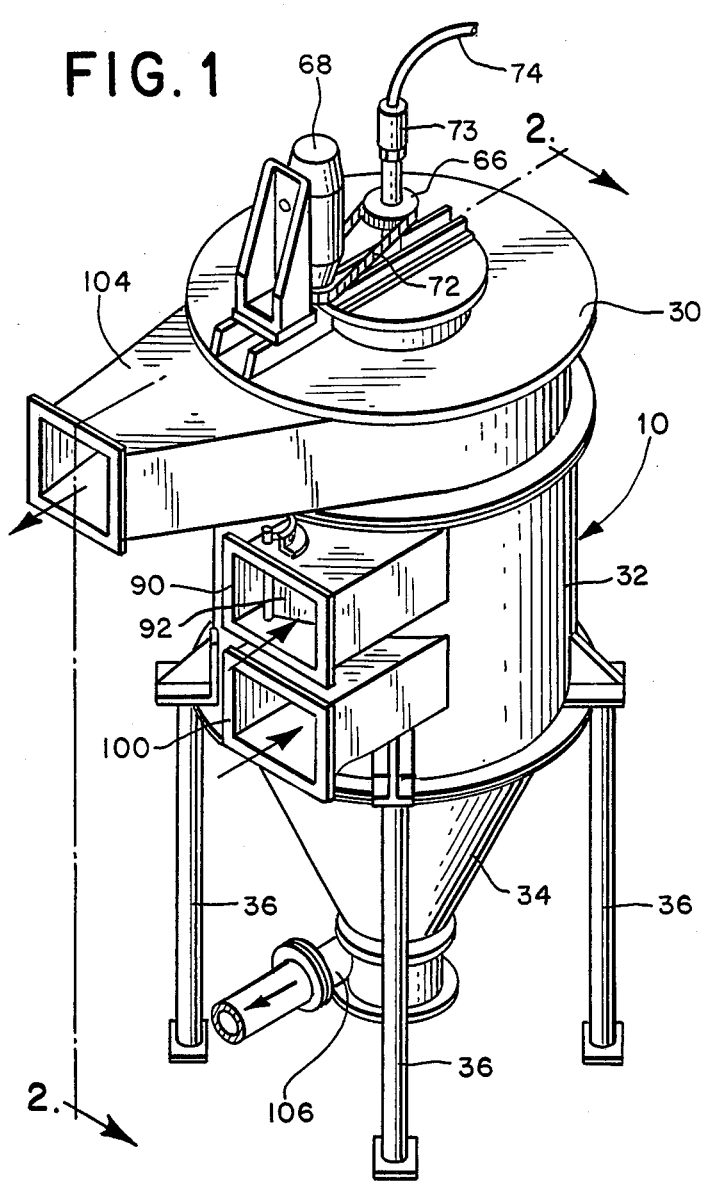
FIG. 1 is a perspective view of a separator which incorporates a first preferred embodiment of this invention.

Turning now to the drawings, FIGS. 1 through 9 show various views of a separator 10 which incorporates a first preferred embodiment of this invention. As best shown in FIGS. 1 and 2, the separator 10 includes an enclosed housing made up of an upper housing 30, a central housing 32, and a lower housing 34. In this embodiment the upper and central housings 30,32 are substantially cylindrical in shape, and the lower housing 34 is shaped as a downwardly pointed cone. Support legs 36 support the separator 10 on a floor surface. The central housing 32 defines four spaced windows 38 and the lower housing 34 defines a window 38 which can be used to observe the flow pattern within the central and lower housings 32,34.

Figure 7:
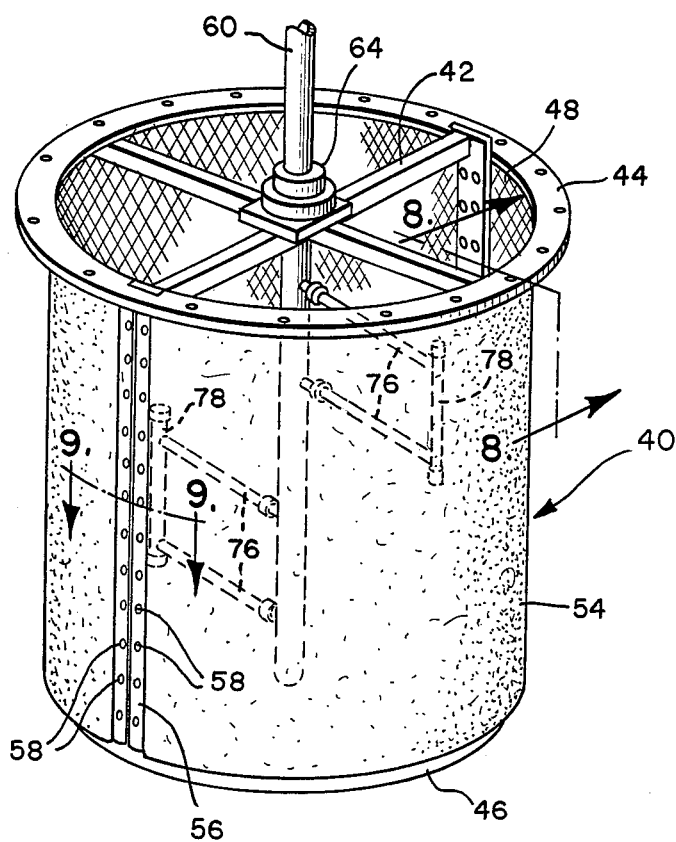
FIG. 7 is a perspective view of a screen basket included in the separator of FIG. 1.

As best shown in FIGS. 2 and 7, the separator 10 includes a screen basket 40 which is generally cylindrical in shape. The screen basket 40 includes an upper centering spider 42 which is rigidly secured to an upper mounting flange 44. The screen basket 40 also includes a lower plate 46, and a cylindrical wall 48 extends around the perimeter of the screen basket 40 between the upper flange 44 and the lower plate 46. A ring brace 50 is secured to the wall 48 at an intermediate position between the upper flange 44 and the lower plate 46. A mounting ring 52 is rigidly secured to the separator 10 between the upper and central housings 30,32, and the upper flange 44 is bolted in place to the mounting ring 52. In this way, the screen basket 40 is rigidly and fixedly mounted within the central housing 32 such that the wall 48 is centered within and concentric with the central housing 32.

Figure 9:
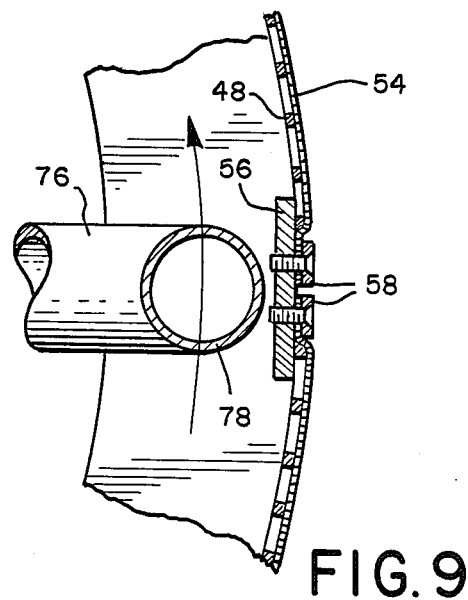
FIG. 9 is a partial sectional view taken along line 9—9 of FIG. 7.

A fine screen 54 is rigidly secured to the wall 48, as for example by welding. In this embodiment the wall 48 is formed of an expanded metal such that the wall 48 provides rigid support to the screen 54 without substantially obstructing the flow of air and fines through the screen 54. As best shown in FIGS. 7 and 9, a pair of diametrically opposed plates 58 are rigidly mounted to the screen basket 40 between the upper flange 44 and the lower plate 46. These plates 56 define parallel apertures sized to receive respective fasteners 58. These fasteners 58 are used to clamp the screen 54 in place on the screen basket 40 prior to welding.

Returning to FIG. 2, the separator 10 includes a tubular shaft 60 which is axially positioned with respect to the central housing 32 and the screen basket 40. The shaft 60 passes through an opening 62 in the upper housing 30, which is preferably sealed to allow the shaft 60 to rotate without substantial leakage between the shaft 60 and the upper housing 30. The shaft 60 is mounted for rotation in bearings 64 which are in turn mounted to the screen basket 40. A drive sprocket 66 is mounted to the shaft 60, and this drive sprocket 66 is coupled to an electric motor 68 via a motor sprocket 70 and a drive chain 72. The motor 68 rotates the shaft 60 with respect to the screen basket 40.

The uppermost end of the shaft 60 includes a rotary coupling 73 which is used to connect the shaft 60 with a source 74 of compressed air. Compressed air is passed from the source 74 via the rotary coupling 73 and the shaft 60 into the screen basket 40. Two diametrically opposed sets of support arms 76 are mounted to the shaft 60 within the screen basket 40. Each pair of support arms 76 is interconnected by a respective cross tube 78, which is capped at each end by a respective cap 82.

Figure 8:
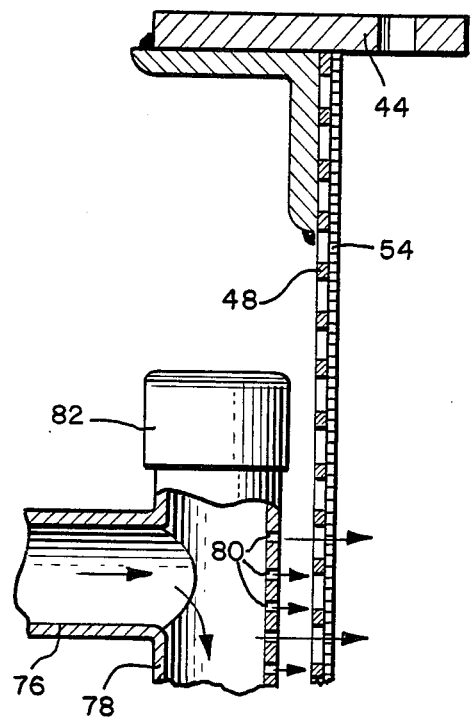
FIG. 8 is a partial sectional view taken along line 8—8 of FIG. 7.

As best shown in FIG. 8, each of the cross tubes 78 defines a linear array of spaced openings 80 which are oriented to face the screen 54. The support arms 76 and the cross tubes 78 are hollow, and the openings 80 direct compressed air from the air source 74 against the radially inner surface of the screen 54. As the motor 68 rotates the shaft 60, the cross tubes 78 are swept across substantially the entire surface of the screen 54, thereby directing compressed air radially outwardly through the screen 54.

Figure 6:
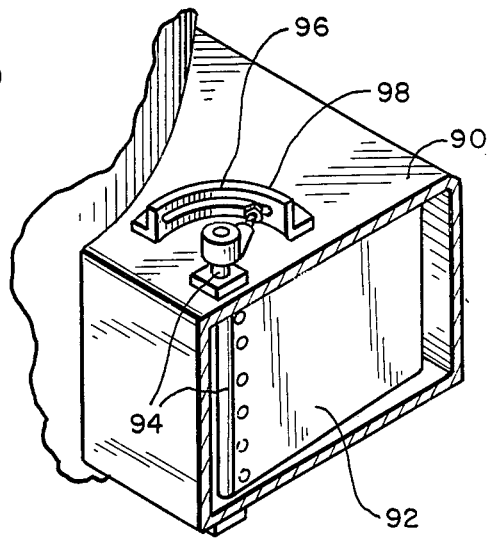
FIG. 6 is a perspective view of a damper included in the separator of FIG. 1.
Figure 4:
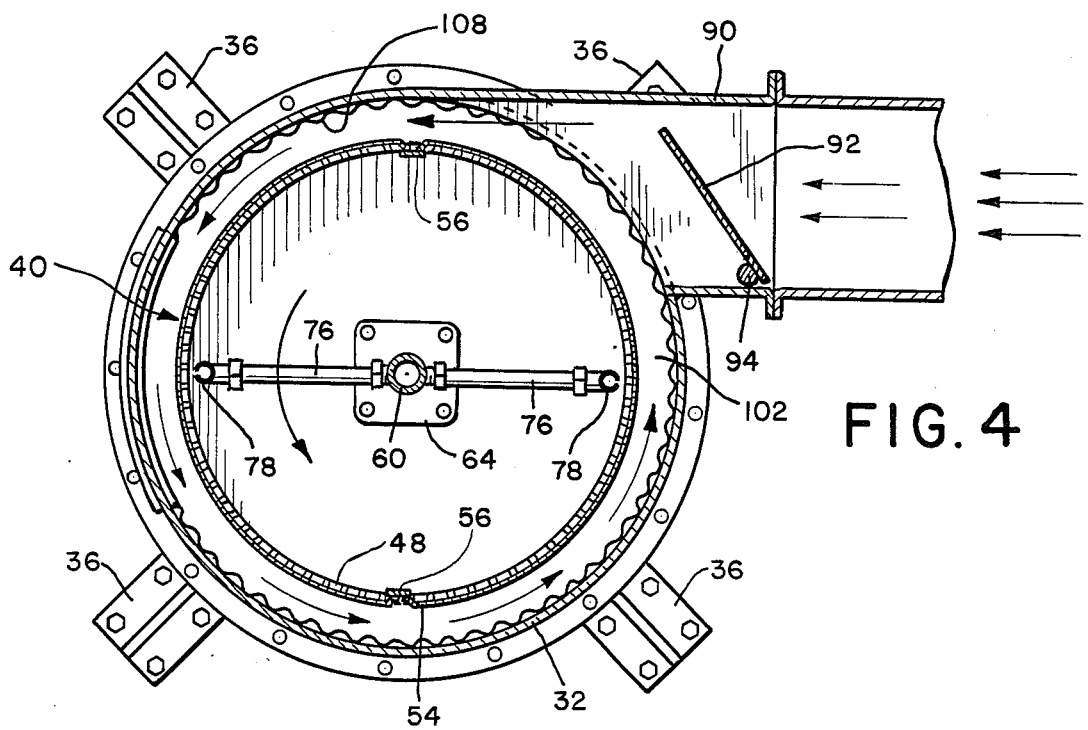
FIG. 4 is a cross-sectional view taken along line 4—4 of FIG. 2.

As best shown in FIGS. 1, 2 and 4, the separator 10 includes an upper inlet duct 90 which is secured to and passes through the central housing 32. A damper 92 is mounted within the upper inlet duct 90 to pivot about an axis 94 (FIG. 6). An arcuate guide 96 is mounted on an exposed surface of the upper inlet duct 90, and a clamp 98 is secured to the damper 92. The clamp 98 can be secured at any desired point along the guide 96 to lock the damper 92 in position.

As shown in FIGS. 1 and 2, the separator 10 also includes a lower inlet duct 100 which is mounted directly beneath and parallel to the upper inlet duct 90. Both the upper and lower inlet ducts 90,100 are positioned to introduce air tangentially into the region between the screen basket 40 and the central housing 32. This region forms a swirl volume 102 extending completely around the perimeter of the screen basket 40.

As best shown in FIGS. 2 and 4 an array of axially extending ridges is secured to the interior of the central housing 32 in the swirl volume 102. The purpose of these ridges 108 is to increase turbulence of air flow in the central housing 32.

Figure 3:
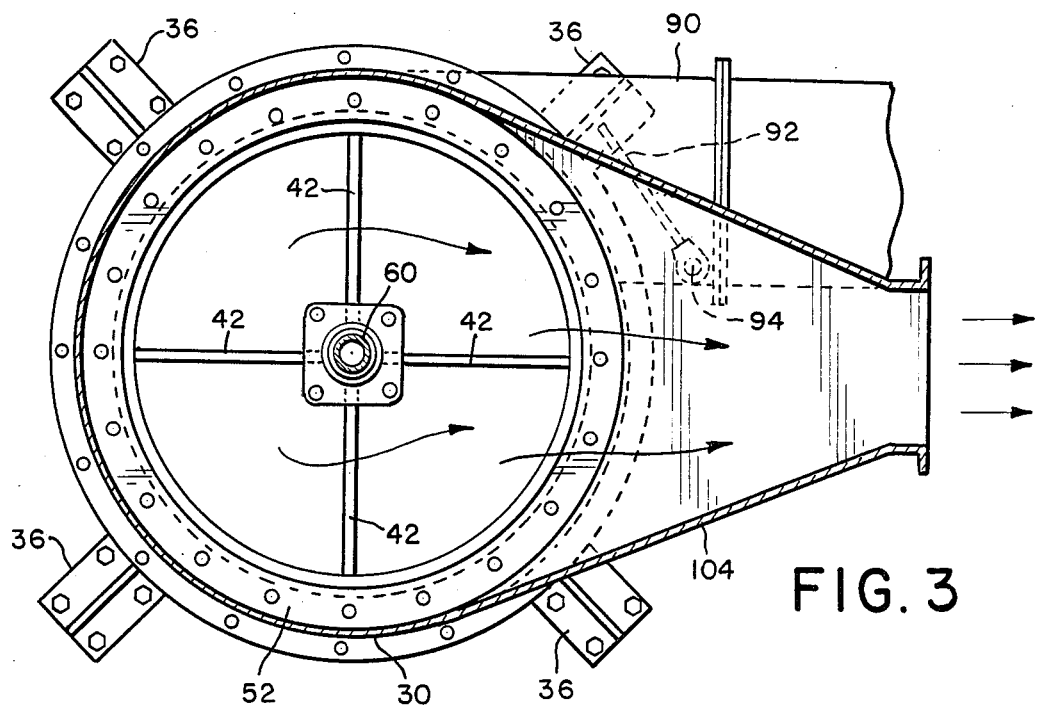
FIG. 3 is a cross-sectional view taken along line 3—3 of FIG. 2.
Figure 5:
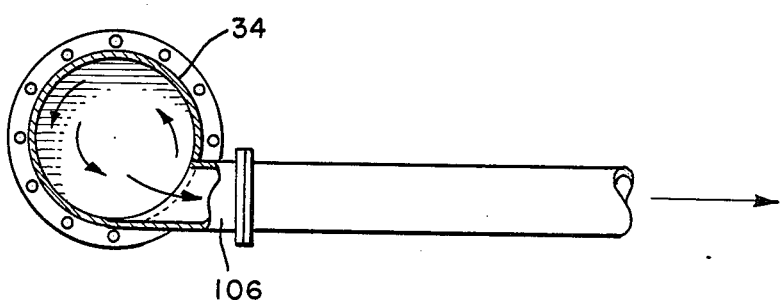
FIG. 5 is a cross-sectional view taken along line 5—5 of FIG. 2.

The separator 10 also includes an upper outlet duct 104 which is connected to the upper housing 30 (FIG. 3). A lower outlet duct 106 is positioned at the bottom of the lower housing 34, as shown in FIGS. 2 and 5.

Figure 10:
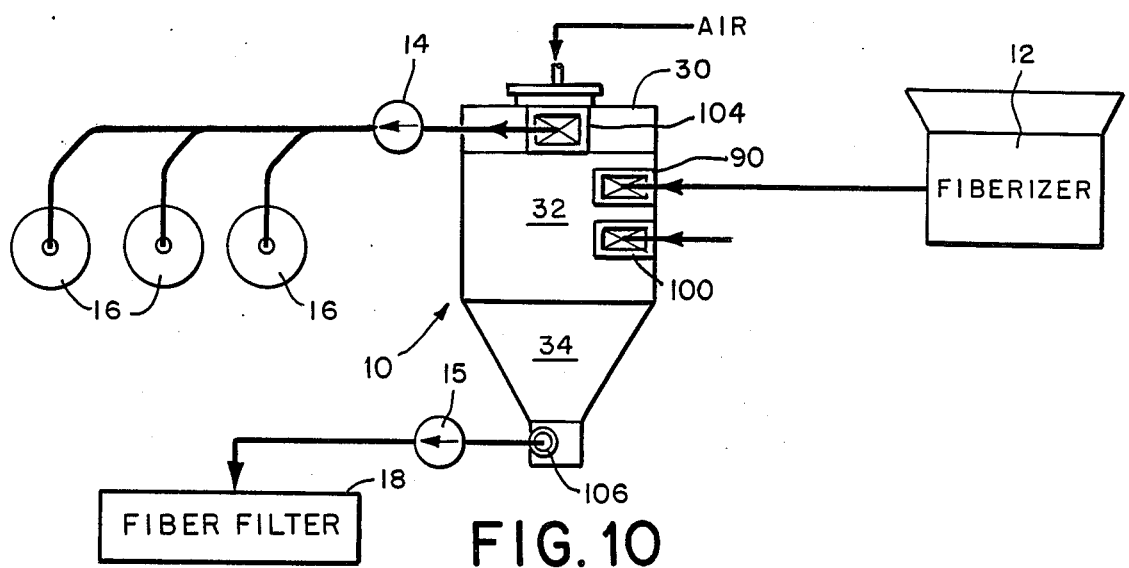
FIG. 10 is a schematic representation of a dry deinking system incorporating the separator of FIG. 1.

The separator 10 is well suited for separating fibers from fines in a dry de-inking process of the type described in co-pending application Ser. No. 06/554,174, assigned to the assignee of the present invention. FIG. 10 shows a schematic diagram of the use of the separator 10 in one such dry de-inking process. As shown in FIG. 10, the upper inlet duct 90 of the separator 10 is coupled to a fiberizer 12 to receive a flow of air including fiberized paper and fines from the fiberizer 12. When used in a de-inking operation, the fiberizer 12 dislodges fines including ink-bearing fines from the fibers, and the separator 10 operates to separate the ink-bearing fines from the fibers in order to de-ink the fibers. In the system of FIG. 10 auxiliary air is introduced via the lower inlet duct 100. The moving air and entrained fibers and fines move around the screen basket 104 in the swirl volume 102.

Air is removed via both the upper and lower outlet ducts 104,106 by the fans 14, 15, respectively. The air removed via the upper outlet duct 104 includes fines which have passed through the screen 54 of the screen basket 40. These fines are collected in fines filters 16 which are coupled to the upper outlet duct 104. Fibers which are too large to pass through the screen 54 swirl around the screen 54 in the swirl volume 102 and gradually move downwardly into the lower housing 34. Air and entrained fibers are removed via the lower outlet duct 106 to a fiber filter 18 where the fibers are collected for use. Air from the air source 74 passes via the shaft 60 and the support arms 76 to the cross tubes 78, where it is directed radially outwardly through the screen 54. This flow of radially outwardly directed air dislodges fibers from the exterior of the screen 54 and prevents the screen 54 from clogging.

A number of important features of this embodiment contribute to its high efficiency of separation. First, the auxiliary air flow via the lower inlet duct 100 sets up a circulating air barrier which prevents fines and fibers from dropping abruptly from the upper inlet duct 100 into the lower housing 34. Thus, the auxiliary air flow via the lower inlet duct 100 increases the residence time of the fines and fibers in the central housing 32, and thereby contributes to efficient separation.

It has also been found that efficiency of separation can be improved by ensuring that air flow in the swirl volume 102 is turbulent, so that fibers and fines are repeatedly brought into contact with the screen basket 40. The ridges 108 ensure turbulent air flow in the swirl volume 102. Of course, other structures can be used to create turbulence in the volume 102, such as vanes, projections of other shapes, or air jets directed radially inwardly through the central housing 32.

Simply by way of illustration, the following details of construction and operation are provided in order better to define the preferred embodiment of FIGS. 1 through 9. It should be clearly understood, however, that these details are intended only by way of illustration, and are not intended to limit the scope of this invention.

In the separator 10, the upper inlet duct 90 is 24 inches by 24 inches, and approximately 3,000 cubic feet per minute of air are introduced into the separator 10 via the upper inlet duct 90. The damper 92 is positioned to keep the flow through the upper inlet duct 90 from striking the screen basket 40 directly. In the separator 10 the lower inlet duct measures 24 inches by 22 inches, and approximately 9,000 cubic feet per minute of air is introduced into the separator 10 via the lower inlet duct 100. The cross-sectional dimensions of the upper outlet duct 104 are 20 by 20 inches, and approximately 10,000 cubic feet per minute of air is withdrawn from the separator 10 via the upper outlet duct 104. The lower outlet duct 106 is approximately 9 by 9 inches, and approximately 2,000 cubic feet per minute of air is withdrawn via the lower outlet duct 106. In the separator 10 the openings 80 of the cross tubes 78 are approximately 3/64 of an inch in diameter, and are separated from one another by about one eighth of an inch, measured center to center. Compressed air is introduced into the shaft 60 at a pressure and flow rate sufficient to dislodge fiber from the exterior of the screen 54, about 7.5 psig and about 250 cubic feet per minute in this embodiment. The motor 64 is used to rotate the shaft 60 at about 75 RPM.

In general, excellent separation is obtained using a flow rate of 37.5 pounds per minute of fiber and a combined air flow of about 320 cubic feet per pound of fiber. The separator 10 has been dimensioned to provide a velocity of about 1,200 feet per minute in the swirl volume 102. In this embodiment the screen basket 40 is approximately 66 inches in length and 67.5 inches in diameter. The central housing 32 is 66 inches in length and 84 inches in internal diameter. This results in a swirl volume 102 approximately 8¼ inches in cross-sectional width and 66 inches in length. In the separator 10 the screen 54 is preferably 150 mesh (150 wires per inch in each linear dimension) such as that obtainable from C. E. Tyler Co. of Mentor, Ohio as 304 stainless steel wire cloth (0.0026 inch wire diameter). In this embodiment the ridges 108 are approximately one inch in radial height and are separated by approximately 3 inches (crest to crest) circumferentially.

In general, the flow rates through the upper and lower inlet ducts 90,100 should be adjusted to provide efficient separation. If the velocity in the swirl volume 102 is excessively high, fibers and fines tend to stick to the interior surface of the central housing 32, thereby reducing the efficiency of separation. If the velocity in the swirl volume 102 is excessively low, fines and fibers tend to drop quickly into the lower housing 34, again reducing separation efficiency. By properly adjusting the velocity in the swirl volume 102 and ensuring an adequate degree of turbulence in this region, separation efficiency can be optimized.

It has been found important to provide a stiff, rigid mounting for the screen 54 in order to minimize the tendency of the screen 54 to flutter and thereby to maximize the life of the screen 54. In the separator 10, this is obtained by rigidly securing the expanded metal wall 48 in place, and then by spot welding the screen 54 directly to the wall 48. Details of materials and fabrication for the housings 30,32,34, should be selected according to standard engineering principles. The highly abrasive nature of the fibers can cause significant abrasion to the housings 30,32,34, and for this reason relatively heavy gauge materials are preferred.

Figure 11:
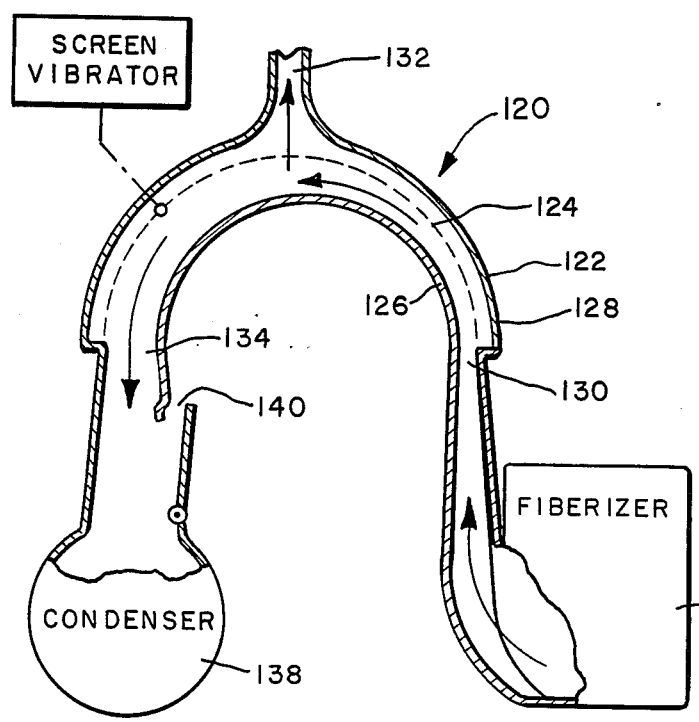
FIG. 11 is a schematic representation of a separator which incorporates a second preferred embodiment of this invention.

FIG. 11 shows a schematic view of a separator 120 which incorporates a second preferred embodiment of this invention. This separator 120 includes an enclosed arcuate housing 122 in which is mounted a screen 124 which is formed in the shape of a semi-cylinder. The housing 122 includes an inner concave wall 126 and an outer convex wall 128. An inlet 130 is provided adjacent one edge of the screen 124 between the screen 124 and the inner wall 126. A first outlet 132 is provided in the outer wall 128 to withdraw air and fines that have passed through the screen 124. A second outlet 134 is provided adjacent the opposite edge of the screen 124 between the screen 124 and the inner wall 126 to receive air and fibers that have passed through the housing 122. As shown in FIG. 11, the separator 120 is preferably coupled between a fiberizer 136 and a condenser 138 such that the fiberizer 136 supplies air, fiber and fines to the inlet 130 and the condenser 138 receives fibers and air from the second outlet 134. Fines and air which have passed through the screen 124 are removed via the first outlet 132. If necessary, auxiliary air can be introduced via the duct 140 between the second outlet 134 and the condenser 138.

The separator 120 is similar to the separator 10 in that the air, entrained fibers, and fines are introduced tangentially onto the arcuate screen 124, which is statically positioned within the housing 122. However, in the separator 122 the fibers, fines and air are introduced onto the radially inner surface of the screen 124. If desired, means can be provided for vibrating the screen 124 to reduce clogging of the screen 124 by fibers.

From the foregoing, it should be apparent that two embodiments have been described which provide a statically mounted screen for separating fibers from fines in an incoming air flow. In both cases, problems relating to balance of the screen are avoided and moving parts are minimized. In both cases the life of the wire screen is excellent because the screen is not flexed in use. Furthermore, no seals are required against the screen and, of course, no mechanism is required for driving the screen. Moreover, this invention is not limited to use in de-inking operations, and the terms "fibers" and "fines" are used in their broad sense herein to encompass materials which fail to pass through and which pass through the screen, respectively.

Of course, it should be understood that a wide range of changes and modifications can be made to the preferred embodiments described above. For example, air, fibers and fines can be injected into a separator similar to the separator 10 at a plurality of points around the circumference of the separator. Also, the screen used in this invention can include a wide variety of filtering media, and is not limited to wire cloth. Furthermore, details of construction, proportion, materials and structure can be modified as necessary to suit the particular application. It is therefore intended that the foregoing detailed description be regarded as illustrative rather than limiting, and that it be understood that it is the following claims, including all equivalents, which are intended to define the scope of this invention.

We claim:

1. A separator for separating fibers from fines in a flow of gas, said separator comprising:
   an enclosed housing comprising a cylindrical upper section and a lower section;
   a screen basket fixedly mounted in the housing, said basket defining a screened cylindrical wall, a closed bottom and an open top and positioned in the housing to define an annular chamber between the upper section of the housing and the screened cylindrical wall of the basket, said screen adapted to prevent passage of fibers and permit passage of fines therethrough;
   a first duct mounted to pass a first flow of gas, fibers and fines into an upper portion of the annular chamber, said first duct oriented tangentially to cause the first flow to swirl around the screened cylindrical wall;
   a second duct mounted to pass a second flow of gas into a lower portion of the annular chamber, said second duct oriented tangentially to cause the second flow to swirl around the screened cylindrical wall in the same direction as the first flow;
   a third duct mounted to receive a third flow of gas and fines which has passed through the screened cylindrical wall and to remove the third flow from the screen basket;
   a fourth duct mounted to receive a fourth flow of gas and fibers which has passed to the lower section of the housing and to remove the fourth flow from the lower section; and means for dislodging fibers from the screened cylindrical wall.

2. The separator of claim 1 wherein the lower section is shaped as a downwardly pointing cone comprising an apex, and wherein the fourth duct is mounted to the apex.

3. The separator of claim 1 wherein the dislodging means comprises:
first means for defining an array of air nozzles;
means for mounting the first means for rotation in the screen basket such that the air nozzles sweep across the screened cylindrical wall as the first means rotates;
means for rotating the first means; and
means for supplying a compressed gas to the air nozzles such that the compressed gas is directed radially outwardly through the screened cylindrical wall as the first means rotates, thereby dislodging fibers from the screened cylindrical wall.

4. The separator of claim 1 further comprising means for creating turbulence in the annular chamber.

5. The separator of claim 4 wherein the turbulence creating means comprises an array of ridges mounted at a radially outer portion of the annular chamber, said ridges oriented at an angle to the swirling first flow.

6. The separator of claim 1 wherein the first and second ducts are oriented parallel to one another, with the second duct beneath the first duct.

7. The separator of claim 1 wherein the screened cylindrical wall comprises:
a rigid frame;
a cylinder of expanded metal rigidly secured to the frame; and
a fine screen rigidly secured to the cylinder of expanded metal.

8. The separator of claim 7 wherein the fine screen is welded to the cylinder of expanded metal.

* * * * *